United States Patent [19]
Yu

[11] Patent Number: 6,132,654
[45] Date of Patent: *Oct. 17, 2000

[54] ULTRA-THIN, SINGLE-PLY BATTERY SEPARATOR

[75] Inventor: Wei-Ching Yu, Gastonia, N.C.

[73] Assignee: Celgard Inc., Charlotte, N.C.

[*] Notice: This patent is subject to a terminal disclaimer.

[21] Appl. No.: 09/441,418

[22] Filed: Nov. 16, 1999

Related U.S. Application Data

[62] Division of application No. 08/896,513, Jun. 22, 1997, which is a continuation of application No. 08/650,210, May 20, 1996, Pat. No. 5,691,077, which is a continuation of application No. 08/359,772, Dec. 20, 1994, abandoned.

[51] Int. Cl.⁷ ........................................... B29D 7/00
[52] U.S. Cl. ......................... 264/46.1; 156/160; 156/227
[58] Field of Search ................. 156/160, 204, 156/227; 264/46.1; 29/623.3, 623.4

[56] References Cited

U.S. PATENT DOCUMENTS

| | | | |
|---|---|---|---|
| 3,901,958 | 8/1975 | Doll | 264/46.1 X |
| 4,465,748 | 8/1984 | Harris | 429/247 |
| 4,769,299 | 9/1988 | Nelson | 429/57 |
| 4,812,189 | 3/1989 | Regipa | 156/204 X |
| 5,281,498 | 1/1994 | Muto et al. | 429/247 |
| 5,376,218 | 12/1994 | Mito et al. | 156/204 X |
| 5,609,947 | 3/1997 | Kamei et al. | 428/212 |
| 5,667,911 | 9/1997 | Yu et al. | 429/144 |
| 5,691,077 | 11/1997 | Yu | 429/62 |

OTHER PUBLICATIONS

"Characterization of Microporous Membrane Separators", Mar. 1–4, 1993 delivered at the Tenth International Seminar on Primary and Secondry Battery Technology and Application Coordinated by: Florida Educational Seminars, Inc. 2836 Banyan Blvd. Circle NW, Boca Raton, FL 33431.

*Primary Examiner*—Stephen Kalafut
*Attorney, Agent, or Firm*—Robert H. Hammer, III

[57] ABSTRACT

A battery separator is made from a microporous polyolefin membrane having a thickness of less than or equal to 0.5 mil. The separator is made by extruding a parison, collapsing the parison to form a flat sheet comprising two plies, annealing the sheet, stretching the sheet, and winding the sheet.

2 Claims, No Drawings

ULTRA-THIN, SINGLE-PLY BATTERY SEPARATOR

RELATED APPLICATIONS

This application is a divisional of U.S. application Ser. No. 08/896,513 filed Jun. 22, 1997 which was a continuation of U.S. application Ser. No. 08/650,210 filed May 20, 1996, now U.S. Pat. No. 5,691,077, which was a continuation of U.S. application Ser. No. 08/359,772 filed Dec. 20, 1994, now abandoned.

FIELD OF THE INVENTION

The present invention is directed to an ultra-thin, single-ply battery separator.

BACKGROUND OF THE INVENTION

In batteries, the anode and cathode are separated from one another by a separator. Today, "lithium batteries" are very popular because they are able to generate high energy outputs. The lithium battery market can be divided into two groups, the "primary" lithium battery and the "secondary" lithium battery. The primary lithium battery is a disposable battery, while the secondary lithium battery is a rechargeable battery.

In batteries, thin battery separators can provide several advantages that can improve the battery's performance and design. First, thinner separators enable attainment of higher rate capabilities. This means that the battery is able to produce higher current densities across the membrane because the electrical resistance of the separator can be reduced by reducing the separator's thickness. For a correlation of Gurley value to electrical resistance: See generally, Callahan, R. W. et al, "Characterization of Microporous Membrane Separators," Mar. 1–4, 1993 delivered at the Tenth International Seminar on Primary and Secondary Battery Technology and Application sponsored by Florida Educational Seminars, Inc., 2836 Banyon Blvd. Circle N.W., Boca Raton, Fla. 33431. The higher rate capabilities are important where quick power is needed (e.g., for acceleration in an electrical vehicle). Second, thinner separators allow the use of thinner electrodes. This means that the battery attains better electrode utilization and electrode cycling. The electrode utilization means that smaller batteries with equivalent power can be produced. The better electrode cycling means a greater number of rechargings over the battery's life. Third, thinner separators allow greater choice in separator design. In other words, various thin separators can be combined to custom design a separator for a particular battery.

Accordingly, there is a need in the battery arts for thinner battery separators.

SUMMARY OF THE INVENTION

A method for making a microporous polyolefin membrane for use in battery separator having a thickness ranging from about 0.3 mil to about 0.5 mil comprising the steps of: extruding a parison; collapsing the parison onto itself to form a flat sheet comprising two plies; annealing the flat sheet; stretching the flat sheet; and winding up the flat sheet, and adhesion force between the two plies being less than 8 grams per inch.

DESCRIPTION OF THE INVENTION

The present invention shall be described in further detail below by way of the following detailed description and the non-limiting examples.

The battery separators according to the instant invention comprises an ultra-thin layer. The layer is, of course, microporous and is discrete. For example, see: Kesting, R. E., *Synthetic Polymeric Membranes,* 2nd Ed., John Wiley & Sons, New York City, N.Y., (1985) at section 8.2 versus Ibid. Chapter 7, this reference is incorporated herein by reference.

Polyolefin, as used herein, refers to a class or group name for thermoplastic polymers derived from simple olefins. Exemplary polyolefins include polyethylene and polypropylene. Polyethylene refers to, for example, polymers and copolymer substantially consisting of ethylene monomers. Polypropylene refers to, for example, polymers and copolymers substantially consisting of propylene monomers.

The thickness of these separators is less than or equal to 0.5 mil (about 12 microns). These separators preferably range in thickness from about 0.3 mil (about 7 micron) to about 0.5 mil (about 12 microns).

The process, by which the inventive separators are made, broadly comprises the following steps: extruding a polymer to form a sheet; annealing the sheet; and stretching the annealed sheet. The specific methods for making these sheets, particularly polyethylene or polypropylene, will be discussed with references to the method of making membranes having a thickness greater than 1 mil. By way of non-limiting example, the following references, each of which is incorporated herein by reference, illustrate the state of the art for making membranes having a thickness greater than 1 mil: U.S. Pat. Nos. 3,426,754; 3,588,764; 3,679,538; 3,801,404; 3,801,692; 3,843,761; 3,853,601; 4,138,459; 4,539,256; 4,726,989; and 4,994,335, each of the foregoing is incorporated herein by reference. Knowledge of these methods being assumed, the inventive process for making thin membranes shall be described below by way of explaining the differences between the prior art methods for making standard films (thickness greater than 1 mil) and inventive method of making a thin film (thickness less than about ½ mil).

The differences discussed below regarding extrusion, annealing, and stretching are based upon a die configuration of a 27" die equipped with a 70 mil mandrel gap. If the die configuration changes, then the differences will change. For example, if a 6" die is used, the die temperature difference between standard film process and thin film process is much smaller. Regardless of die configuration, thin films require less quench air.

With regard to extrusion conditions, standard film processes typically require stronger quench air conditions and lower extrusion temperatures than thin film processes. For example, the relevant quench conditions for a standard film process include: an air pressure of about 6" $H_2O$; an air ring gap in the range of 10/64 to 15/64 inches; and an air ring height of 1 to 2 inches; on the other hand, the relevant quench conditions of a thin film process include: an air pressure of about 0.6 to 3.0" $H_2O$; an air ring gap in the range of 5/64 to 10/64 inches; and a ring height of about 1 to 2 inches. The relevant extrusion conditions for a standard film process (using Exxon's Escorene PP 4292 resin as an example) include: a die temperature in the range of 191 to 198° C. and a barrel temperature of 200 to 205° C.; on the other hand, the relevant extrusion conditions for a thin film process (using the same material) include: a die temperature in the range of 210° C. (for 0.5 mil final product) to 224° C. (for 0.33 mil final product) and a barrel temperature of 210° C.

With regard to annealing and stretching conditions, the inter-ply adhesion (measured as peel strength) must be lower than that of the standard process, so that the individual plies do not split (i.e. tear apart) when they are deplied. The ability to resist splitting is proportional to the ply's thickness. Thus, if the plies stick together (due to adhesion) and the stickiness is greater than the split resistance, then the plies cannot be separated (deplied) without splitting. For example, the adhesion of plies having a thickness of about 1 mil should be less than about 15 grams/inch, whereas for 0.5 mil plies, the adhesion should be less than about 8 grams/inch, and for 0.33 mil plies, less than about 5 grams/inch. To lower the adhesion values, the annealing/stretching temperatures for the inventive process are less than those for the standard process. For example, the annealing/stretching temperatures for a polypropylene film would be in the range of 120–125° C. (inventive process), compared to range of 140–150° C. (standard process), and for a polyethylene film about 110° C. (inventive process compared to about 115° C. (standard process).

Further information about the foregoing invention may be obtained from the following non-limiting examples. The test methods referred to herein are set forth below.

Test Methods

Gurley ASTM-D726(B)
  Gurley is a resistance to air flow measured by the Gurley densometer (e.g. Model 4120). Gurley is the time in seconds required to pass 10 cc of air through one square inch of product under a pressure of 12.2 inches of water.

Thickness Method: T411 om-83 developed under the auspices of the Technical Association of the Pulp and Paper Industry. Thickness is determined using a precision micrometer with a ½ inch diameter, circular shoe contacting the sample at seven (7) PSI. Ten (10) individual micrometer readings taken across the width of the sample are averaged.

Porosity ASTM D-2873

Density ASTM D-792

Peel Strength Peel strength is measured using a tension and compression tester to determine the force in grams required to separate two one-inch wide sections of bonded membrane. The peel rate is 6 inches/minute. Three measurements are taken across the web and averaged.

Melt Index ASTM D 1238; PE: 190° C./2.16 Kg; PP: 230° C./2.16 Kg.

EXAMPLE

Ultra-thin, single-ply battery separators, as disclosed above, were made in the following manner:

The polypropylene and polyethylene resins used are set forth in TABLES 1 & 2:

TABLE 1

Polypropylene (PP Monopolymer)

| | Resin | Density (g/Cm$^3$) | Melt Index (g/10 min) | Supplier |
|---|---|---|---|---|
| A | Escorene PP4292 | 0.90 | 1.4 | Exxon Chemical |
| B | Fina PP 3271 | 0.905 | 1.5 | Fina Oil & Chemical |
| C | Fina PP 3281 | 0.905 | 1.1 | Fina Oil & Chemical |
| D | Escorene PP4292 (nucleated) | 0.90 | 1.4 | Exxon Chemical |
| E | Escorene PP4372* | 0.90 | 1.4 | Exxon Chemical |
| F | Escorene PP3182 | 0.90 | 3.0 | Exxon Chemical |

*contains an antiblocking agent

TABLE 2

Polyethylene (HDPE)

| | Resin | Density (g/cm$^3$) | Melt Index (g/10 min) | Supplier |
|---|---|---|---|---|
| G | Fina HDPEGF7750 | 0.958 | 0.70 | Fina Oil & Chemical |
| H | Escorene HDZ107 | 0.964 | 0.30 | Exxon Chemical |

The extruder equipment was configured, as set forth in TABLE 3:

TABLE 3

Extruder

| | L/D Ratio | Barrel Size | Die Size | Die Opening | Land Length | Blow-up Ratio |
|---|---|---|---|---|---|---|
| E1 | 24 | 2.5" | 12" or 27" | 70 mil | 3" | 1 |
| E2 | 24 | 3.5" | 12" or 27" | 70 mil | 3" | 1 |
| E3 | 30 | 1.25" | 6" | 70 mil | 3" | 1 |

TABLE 4

Extrusion Condition

| Product | Resin (See Tables 1 & 2) | Extruder/Die Size (See Table 3) | Extruder Temp (° C.) | Melt Temp (° C.) | Die Temp (° C.) | Air Ring Height (inch) | Quenching Air Press (inches H$_2$0) | Air Ring Opening (inches) | Thickness (mil) | Line Speed (ft/min) |
|---|---|---|---|---|---|---|---|---|---|---|
| P1 | A | E3/6" | 200 | 205 | 205 | 1" | 1.5" | 0.078 | 0.38 | 42 |
| P2 | C | E3/6" | 205 | 215 | 215 | 1" | 1.5" | 0.078 | 0.38 | 42 |
| P3 | C | E2/27" | 230 | 243 | 243 | 1" | 1.2" | 0.078 | 0.38 | 47 |
| P4 | A | E2/27" | 210 | 224 | 224 | 1" | 1.2" | 0.078 | 0.38 | 50 |
| P5 | A | E2/12" | 220 | 224 | 224 | 1" | 1.2" | 0.078 | 0.38 | 50 |
| P6 | B | E2/27" | 210 | 224 | 224 | 1" | 1.2" | 0.078 | 0.38 | 50 |

TABLE 4-continued

Extrusion Condition

| Product | Resin (See Tables 1 & 2) | Extruder/Die Size (See Table 3) | Extruder Temp (° C.) | Melt Temp (° C.) | Die Temp (° C.) | Air Ring Height (inch) | Quenching Air Press (inches H$_2$0) | Air Ring Opening (inches) | Thickness (mil) | Line Speed (ft/min) |
|---|---|---|---|---|---|---|---|---|---|---|
| E1 | G | E1/27" | 200 | 220 | 200 | 1" | 1.0" | 0.078 | 0.38 | 60 |
| E2 | H | E1/12" | 180 | 199 | 185 | 1.25" | 1.0" | 0.094 | 0.59 | 60 |

The precursor films were annealed in an 8-ply film. This means that since the precursor films are extruded as inflated tubes, when they are collapsed, they created a 2-ply film. Four of these 2-ply films are wound up together to make the 8-ply film. The annealing conditions are set forth below in TABLE 5.

TABLE 5

Annealing Conditions

| Product (see Table 4) | Annealing Temp., ° C. | Annealing Time, Min | Peel Strength (gram/inch) |
|---|---|---|---|
| P1 | 136 | 16 | — |
| P2 | 140 | 16 | — |
| P3 | 120 | 16 | — |
| P4, P5 | 120 | 16 | 2 |
| P6 | 135 | 16 | 0 |
| E1 | 110 | 19 | 1 |
| E2 | 115 | 19 | 1 |

The annealed precursor films are stretched to form microporous membranes. The annealed precursor films were stretched as 16-ply films (8 rolls of 2 ply from an extruded tubular precursor). Alternatively, the annealed precursor films may be stretched as an 8-ply film or 24-ply film. The stretching conditions are set forth in TABLE 6:

TABLE 6

Stretching Conditions

| Product (see TABLE 5) | Cold Stretch, Temp (° C.) | Cold Stretch* | Hot Stretch Temp (° C.) | Hot Stretch* | Hot Relax Temp (° C.) | Hot Relax*,[1] | Thickness (mil) | Gurley (sec) |
|---|---|---|---|---|---|---|---|---|
| P4, P5 | ambient | 25% | 120° C. | 115% | 120° C. | 40% | 0.33 | 12 |
| P6 | ambient | 25% | 135° C. | 115% | 135° C. | 40% | 0.33 | 10 |
| E1 | ambient | 40% | 110° C. | 110% | 110° C. | 50% | 0.33 | 8 |
| E2 | ambient | 45% | 115° C. | 105% | 115° C. | 40% | 0.5 | 11 |

*The percentage of stretching/relaxing was based on the original length before cold stretching
[1]The relax step indicates that the stretched film is allowed to shrink back.

The present invention maybe embodied in other specific forms without departing from the spirit or essential attributes thereof, and, accordingly, reference should be made to the appended claims, rather than to the foregoing specification as indicating the scope of the invention.

What is claimed:

1. A method of making a microporous polyolefin membrane for use as a battery separator having a thickness ranging from about 0.33 mils to about 0.5 mils comprising the steps of:

extruding a parison;

collapsing the parison onto itself to form a flat sheet comprising two plies;

annealing the flat sheet;

stretching the flat sheet; and winding up the flat sheet, and adhesion force between the two plies being less than 8 grams per inch.

2. The method according to claim 1 wherein stretching comprises stretching in at least 2 steps, one a cold stretch step, and the other, a hot stretch step.

* * * * *